April 22, 1969     KWANGHO CHUNG     3,440,532
SPEED SENSOR FOR LINEAR INDUCTION MOTORS
Filed May 7, 1965
FIG. 1
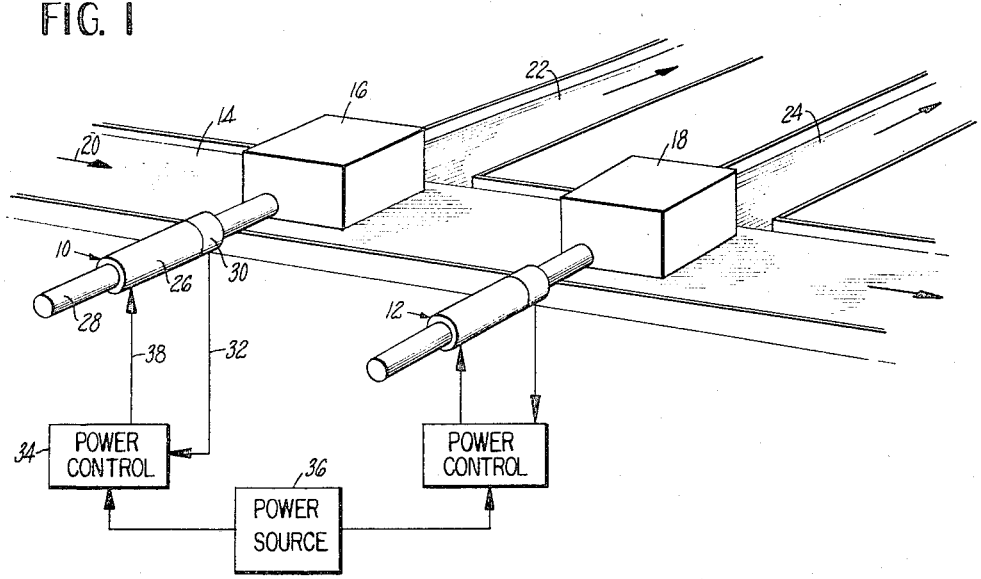
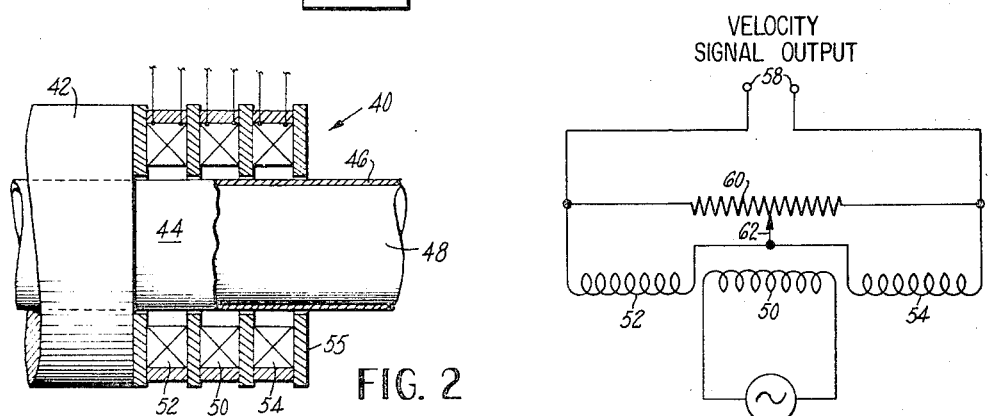
FIG. 2
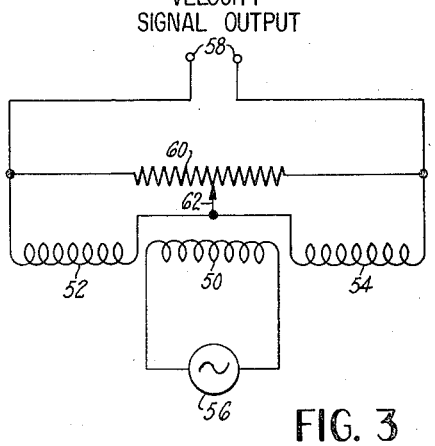
FIG. 3
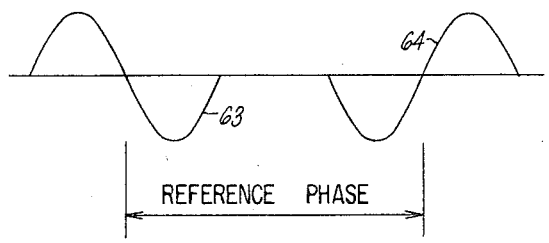
FIG. 4
INVENTOR
KWANGHO CHUNG
BY *Lindsey, Prutzman and Hayes*
ATTORNEYS

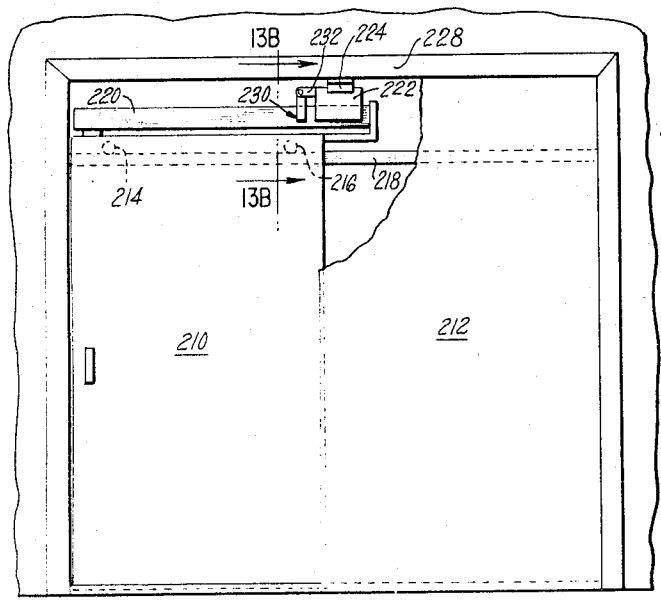
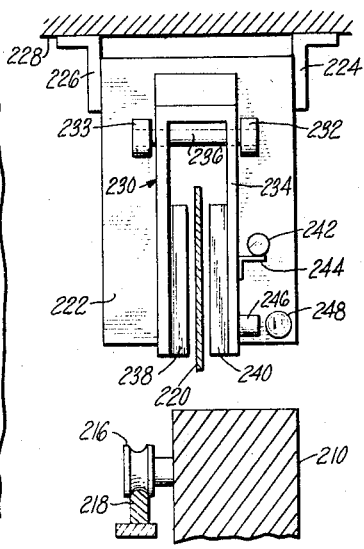
FIG. 13A
FIG. 13B
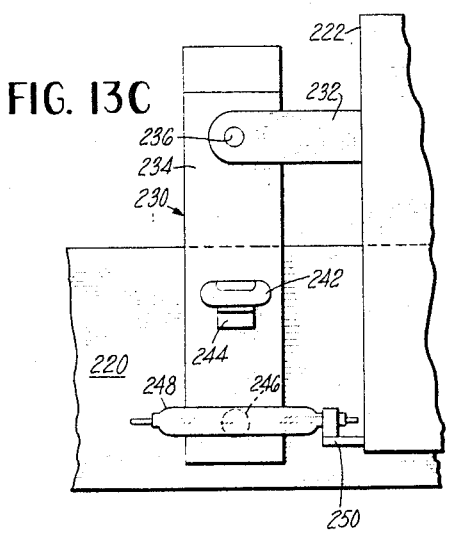
FIG. 13C
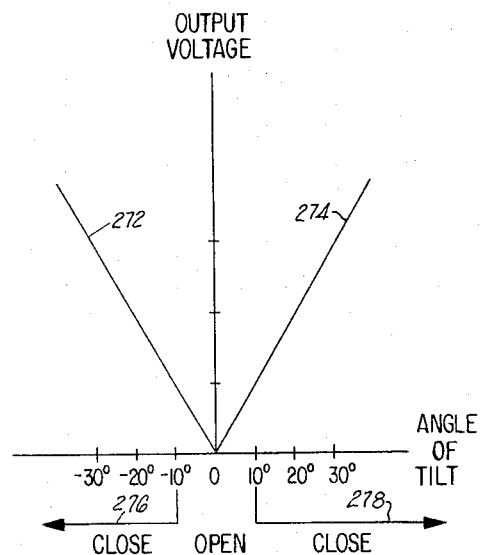
FIG. 14

April 22, 1969     KWANGHO CHUNG     3,440,532
SPEED SENSOR FOR LINEAR INDUCTION MOTORS
Filed May 7, 1965     Sheet 5 of 5

INVENTOR
KWANGHO CHUNG

BY Lindsey, Prutzman and Hayes
ATTORNEYS

United States Patent Office 3,440,532
Patented Apr. 22, 1969

3,440,532
SPEED SENSOR FOR LINEAR INDUCTION
MOTORS
Kwangho Chung, Hartford, Conn., assignor to Skinner
Precision Industries, Inc., New Britain, Conn., a corporation of Connecticut
Filed May 7, 1965, Ser. No. 454,773
Int. Cl. G01r *11/00, 33/14;* G01p *3/22*
U.S. Cl. 324—70                                                 2 Claims

ABSTRACT OF THE DISCLOSURE

Velocity sensor for linear induction motor armature including an eddy current inducing winding surrounding the armature and a pair of oppositely wound, series connected pick-up windings adjacent the first winding for inducing in the pick-up windings a voltage proportional in magnitude to the speed of the armature.

---

This invention generally relates to speed sensors and is more specifically concerned with an eddy current responsive transducer which produces a signal corresponding to the relative velocity of the transducer and a metal conductor.

A general object of this invention is to provide a speed sensor which responds to the magnetic field generated by eddy currents induced in a metal conductor to produce a signal corresponding to the relative velocity of the sensor and the conductor.

Another object of this invention is to provide such eddy current responsive velocity transducers of both an inductive pickup type and a magneto-mechanical type.

A further object of this invention is to provide a linear induction motor with an eddy current responsive speed sensor transducer for controlling the speed of the motor.

An additional object of this invention is to provide a selective delivery system incorporating speed controlled linear induction motor actuators for ejecting articles of different weights from a moving conveyor.

Still another object of this invention is to provide a sliding door linear motor operator with an eddy current responsive velocity transducer for controlling the speed of the linear induction motor.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 shows a selective delivery conveyor system incorporating linear induction motor actuators whose speeds are sensed and controlled by means of the linear motion eddy current transducers embodying this invention;

FIG. 2 shows in cross section one embodiment of such an eddy current transducer as applied to the linear induction motor actuators of FIG. 1;

FIG. 3 is a schematic circuit diagram of the eddy current transducer illustrated in FIG. 2;

FIG. 4 shows the wave forms which are produced at the output of the circuit illustrated in FIG. 3;

FIG. 13A shows a linear induction motor sliding door operator incorporating a permanent magnet and eddy current speed sensor embodying this invention and utilizing a liquid potentiometer to convert the sensor mechanical output to an electrical signal;

FIG. 13B is an enlarged cross-sectional view taken along line B—B of FIG. 13A;

FIG. 13C is a side view of FIG. 13B;

FIG. 14 is a graph showing the idealized relationship between the speed of the sliding door and the electrical signal output from the potentiometer;

FIG. 1 shows a selective delivery conveyor system incorporating linear induction motor actuators 10 and 12 of the type disclosed in U.S. Patent No. 3,148,292 issued Sept. 8, 1964, and assigned to the assignee of the present invention.

Figure 5A:
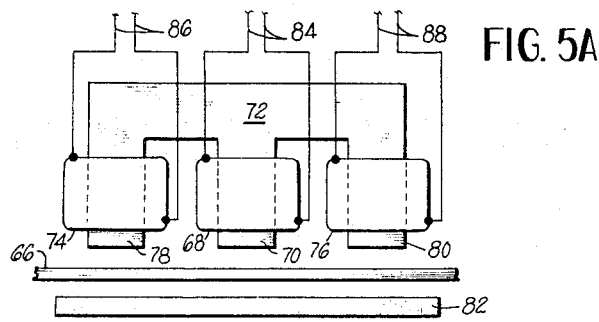
FIG. 5A is a plan view of an eddy current speed sensor embodying this invention as applied to a flat linear induction motor.

A feeder conveyor 14 is shown carrying cartons 16 and 18 in the direction indicated by an arrow 20. A pair of branch conveyors 22 and 24 are disposed at right angles to feeder conveyor 14. Actuators 10 and 12 are selectively energized to eject cartons traveling on conveyor 14 to one or the other of the branch conveyors 22 and 24, respectively.

Let us assume that it is desired to eject all cartons weighing twenty pounds or more onto branch conveyor 22 and all cartons weighing less than twenty pounds onto branch conveyor 24. More specifically, let us assume that carton 16 weighs twenty-five pounds and is to be ejected onto conveyor 22 and carton 18 weighs one pound and is to be ejected onto conveyor 24. With a differential in the weights of the cartons it is necessary to provide some sort of speed control for the linear motor actuators 10 and 12. Otherwise, the linear motor actuators would eject the lighter cartons with such a force that they would overshoot the branch conveyor.

This problem of controlling the speed of a linear induction motor actuator is solved by providing each motor with an eddy current speed sensor embodying this invention.

Linear induction motor actuators 10 and 12 are identical so let us look only at motor 10. It comprises an alternating current stator 26 for providing a traveling magnetic field which induces eddy currents in the movable armature or conducting rod 28. When stator 26 is energized, induction motor action applies a force to rod 28 and causes it to strike carton 16 and eject it from conveyor 14 onto conveyor 22.

A linear motion eddy current speed sensor 30 is mounted adjacent stator 26 and produces on a line 32 an electrical signal indicative of the speed of rod 28. This signal is applied to the power control 34 which is supplied with alternating current power from a power source 36. Power control 34 functions to compare the output signal from sensor 30 with a reference signal to provide on the stator input line 38 a control signal which drives motor 10 at a predetermined speed determined by the comparison circuits and reference signal of the power control 34. When a very light carton is ejected, the actuator will tend to gain excessive speed and eject the carton with such force that the carton overshoots the branch conveyor. However, the eddy current speed sensor 30 detects the linear velocity of the armature or conducting rod 28 to provide a speed signal which is used by power control 34 to maintain the actuator speed below a predetermined value, thereby insuring that none of the cartons is ejected onto a branch conveyor with excessive force.

FIG. 2 shows a cross-sectional view of an inductive type of eddy current velocity sensor 40 which may be used as the velocity sensor 30 in FIG. 1. Sensor 40 may be mounted in the same housing 42 which contains the stator coils of a linear induction motor actuator. The armature or rod 44 comprises a tubular sleeve 46 of electrically conductive material, such as copper or the like. disposed about an inner core 48 of magnetic material. The velocity sensor 40 itself comprises an exciting winding 50 and two pickup coils 52 and 54 mounted on a soft iron core or shell 55.

Let us refer to the circuit diagram of FIG. 3 and the wave form diagram of FIG. 4 for a better understanding of the manner in which eddy current speed sensor 40 functions. Exciting winding 50 is connected to an AC source 56 and produces an alternating current magnetic field which induces eddy currents in the conducting sleeve 46 of armature 44. Pickup coils 52 and 54 are oppositely wound and connected in series. The outer ends of pickup coils 52 and 54 are connected to a pair of output terminals 58. A potentiometer including a fixed resistor 60 may be connected across output terminals 58 and a slidable tap 62 connected to the inner ends of pickup coils 52 and 54 for the purpose of null balancing the circuit.

FIG. 4 shows wave forms on the output terminals 58. It is assumed that the current through exciting winding 50 is constant. Therefore, as rod 44 moves in the forward direction, for example, eddy currents are induced in the conductive sleeve 46. A voltage is induced in pickup coils 52 and 54 as shown by wave form 63 in FIG. 4. The magnitude of the induced voltage or signal appearing at output terminals 58 is proportional to the speed of conductor 44 relative to the speed sensor 40. The phase of the signal is proportional to the direction of movement of the rod 44. Therefore, the signal is indicative of the relative velocity of the conductor rod 44 and sensor 40. As shown in FIG. 4, for the assumed forward direction of armature 44, the negative half cycle of signal wave form 63 occurs first, and for the reverse direction of movement, the positive half cycle of signal wave form 64 occurs first.

Figure 5B:
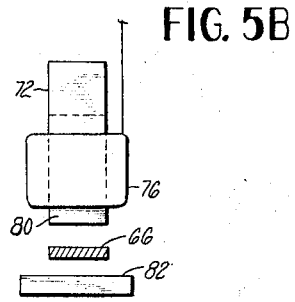
FIG. 5B is a side view of FIG. 5A.

FIGS. 5A and 5B show another inductive type of eddy current velocity sensor for detecting the velocity of a moving flat conductor 66 which may be the armature of a flat linear induction motor. An exciting coil 68 is mounted on the center leg 70 of an E-shaped laminated magnetic core 72. Pickup coils 74 and 76 are mounted on the outer legs 78 and 80, respectively, of core 72. A stationary magnetic plate 82 completes the magnetic circuit. The exciting coil terminals 84 and pickup coil terminals 86 and 88 are connected in the same circuit illustrated in FIG. 3 to produce a velocity signal whose magnitude and phase are proportional to the speed and direction of the movement of strip conductor 66 relative to the pickup coils 74 and 76.

Figure 6A:
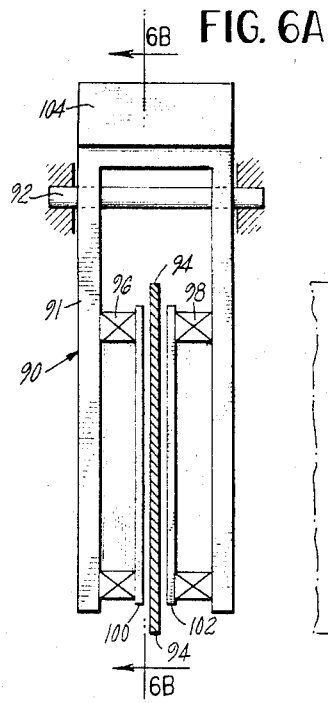
FIG. 6A is a plan view of a single pole electromagneto-mechanical eddy current speed sensor embodying this invention.
Figure 6B:
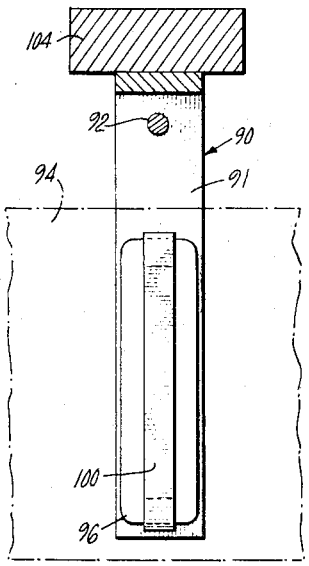
FIG. 6B is a cross-sectional view taken along line B—B of FIG. 6A.
Figure 6C:
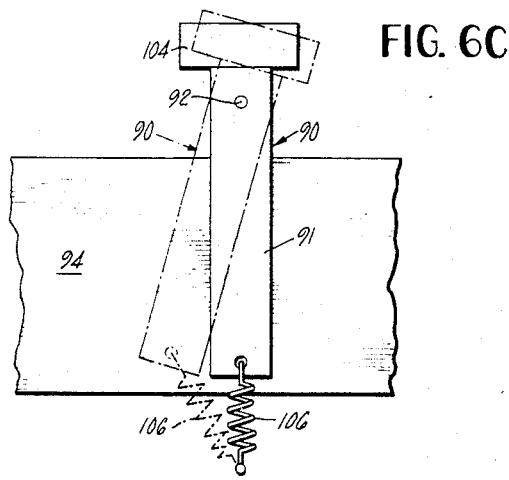
FIG. 6C illustrates the manner in which the sensor of FIGS. 6A and 6B may be mounted.

Another form of eddy current velocity sensor is shown in FIGS. 6A, 6B and 6C. Whereas the embodiments of the sensor shown in FIGS. 2 and 5 are inductive types which provide an electrical signal proportional to the velocity of the moving conductor, FIGS. 6A, 6B and 6C show an eddy current velocity sensor 90 which produces a mechanical output signal corresponding to the speed of the moving conductor. Sensor 90 may be described as an electromagnetomechanical type. It comprises a U-shaped magnetic core or shell 91 which is pivotally mounted at its upper end on a pin 92. The arms of the core extend on either side of a moving conductor strip 94 which once again may be the armature of a flat type linear induction motor. A pair of coils 96 and 98 are mounted on the inner faces of the arms of magnetic core 91 and carry pole pieces 100 and 102, respectively, which define a gap through which the conductor strip 94 travels. Eddy currents induced in the conductor 94 generate magnetic fields which interact with the magnetic field of the coils 96 and 98 to produce a physical force which is exerted on the coils 96 and 98 and the core 91 to which they are fixed. Consequently, core 91 will pivot on pin 92 through an angle related to the speed of the moving conductor. This angular displacement may be converted to an electrical output signal by various means discussed below.

By virtue of the eddy current effect between the moving conductor 94 and the magnets 96 and 98, sensor 90 has a certain amount of inherent damping. However, if more damping is required, a block 104 of suitable weight may be placed on top of the U-shaped core 91. As shown in FIG. 6C, the lower end of sensor 90 is secured to a spring 106 which resists the angular displacement caused by the eddy current effect.

Figure 7A:
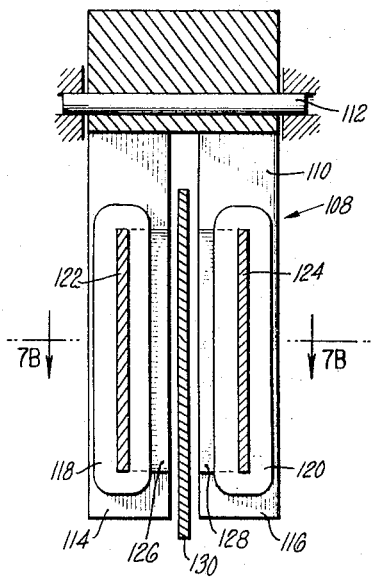
FIG. 7A is a sectional view of a double pole, electromagneto-mechanical eddy current speed sensor embodying this invention.
Figure 7B:
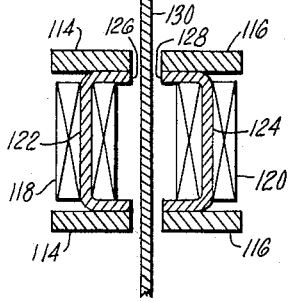
FIG. 7B is a cross-sectional view taken along line B—B of FIG. 7A.

Whereas FIGS. 6A and 6B show a single pole electromagnetic velocity sensor, FIGS. 7A and 7B show sectional view of a two-pole electromagnetic coil velocity sensor 108. A non-magnetic frame 110 is pivotally mounted on a pin 112 and has a pair of depending legs 114 and 116. Electrical coils 118 and 120 are mounted on these legs about respective magnetic cores 122 and 124. Pole pieces 126 and 128 are fixed to the coils and define an air gap through which a traveling strip conductor 130, such as the armature of a flat linear induction motor, travels.

Figure 8:
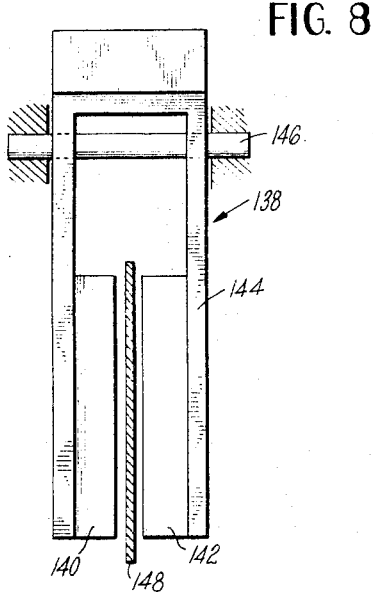
FIG. 8 shows a permanent magneto-mechanical type eddy current speed sensor embodying this invention and applied to a flat conductor linear induction motor.

FIG. 8 illustrates a single pole permanent magnet eddy current speed sensor 138 very similar to the sensor illustrated in FIGS. 6A and 6B. A pair of permanent magnets 140 and 142 are mounted on the inner faces of a U-shaped magnetic core 144 which is pivotally mounted at its upper end on a pin 146. The inner faces of the permanent magnets define an air gap through which a strip conductor 148 passes. The interaction of the magnetic fields of the permanent magnets and of the eddy currents induced in conductor 148 produces a force which causes core 144 to rotate about pin 146 through an angular displacement related to the speed of conductor 148. The angular displacement of core 144 maybe converted to an electrical output by various devices described below.

Figure 9:
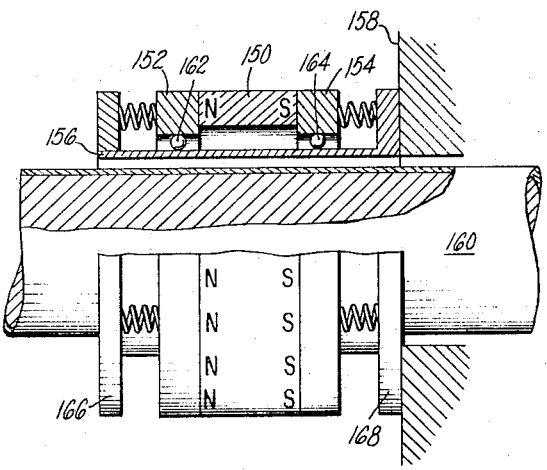
FIG. 9 shows in partial section a permanent magneto-mechanical type eddy current speed sensor embodying this invention as applied to a rod-type conductor or cylindrical linear induction motor.

FIG. 9 illustrates a permanent magnet eddy current velocity sensor for use with a rod-type linear induction motor of the type shown in FIGS. 1 and 2. A permanent magnet shell 150 is secured between two annular pole pieces 152 and 154. An annular non-magnetic housing 156 is fixed to a suitable stationary support 158 to permit the conducting rod or armature 160 of a linear induction motor to pass therethrough. The pole pieces carrying the permanent magnet shell are movably mounted on housing 156 by a plurality of non-magnetic ball bearings, two of which are shown at 162 and 164. A plurality of springs are connected between each pole piece and the adjacent one of flanges 166 and 168 mounted on the opposite ends of housing 156.

As the conducting rod 160 travels through the housing 156, the magnetic field generated by the eddy currents induced therein interact with the magnetic field of the permanent magnet shell 150 to produce a reactive force which causes the assembly including the pole pieces 152 and 154 and the permanent magnet shell 150 to move horizontally in one direction or the other depending upon the direction of movement of the rod 160. The amount of linear displacement of the assembly corresponds to the speed of the rod 160, and the linear displacement may be converted to an electrical output signal by any of the means discussed below.

Figure 10:
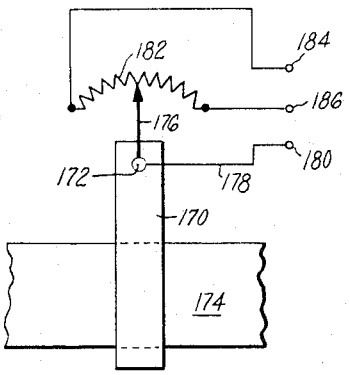
FIGS. 10, 11 and 12 show various forms of transducing devices for converting the mechanical movement of a magneto-mechanical eddy current speed sensor to an electrical signal output.
Figure 11:
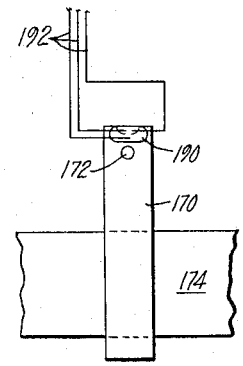
Figure 12:
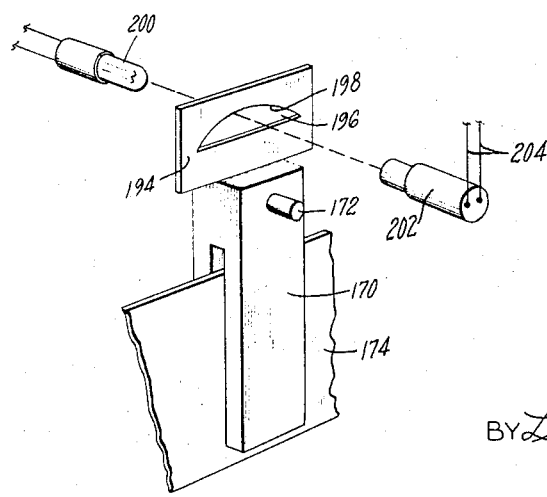

FIGS. 10, 11 and 12 show various devices for converting the mechanical displacement or signal of a magneto-mechanical type eddy current speed sensor to an electrical velocity signal.

In FIG. 10 there is schematically indicated a magneto-mechanical speed sensor 170 which represents any of the speed sensors shown in FIG. 6, 7 or 8. The speed sensor 170 is pivotally mounted by a conducting pin 172. A strip conductor 174 passes between the electromagnets or permanent magnets contained within sensor 170. As conductor 174 moves, the magnetic field generated by the eddy currents slowing therein reacts with the magnetic field of the magnets mounted in the sensor 170 and causes sensor 170 to pivot about pin 172.

A movable tap 176 is fixed to the upper end of sensor 170 and makes electrical contact with pivot pin 172. A lead 178 also makes wiping contact with pivot pin 172 so that the movable tap 176 and lead 178 are electrically interconnected. Lead 178 terminates in output terminal 180. The tap slides along a potentiometer resistor 182 which is connected across a pair of terminals 184 and 186. A suitable constant DC voltage source may be connected across terminals 184, 186. Consequently, as conductor 174 travels and causes sensor 170 to pivot about pin 172, movable tap 176 also pivots so that the tap moves along resistor 182 to either the right or the left of the position shown in FIG. 10. Consequently, the change in voltage appearing across terminals 180 and 186 and across terminals 180 and 184 will be proportional to the angular displacement of sensor 170 and thereby related to the velocity of strip conductor 174.

FIG. 11 shows an arrangement which is electrically equivalent to the potentiometer arrangement of FIG. 10. In FIG. 11, the resistor 182 and movable tap 176 are replaced by a liquid potentiometer 190 which comprises an electrolyte sealed in a glass tube and containing a gravity sensitive air bubble. Such a device is illustrated in greater detail in FIG. 15. Suffice it to say at this point, however, that voltage appearing across the electrode leads 192 vary in proportion to the angle of tilt of the potentiometer 190 and thereby vary in accordance with the velocity of the conductor 174.

FIG. 12 shows still another device for converting the mechanical movement of the eddy current speed sensor 174 to an electrical output. Here a plate 194 is mounted on the top of sensor 170 and has formed therein an aperture 196 having a curved upper surface 198. In the normal position shown in FIG. 12 when conductor 174 is stationary, maximum light from a lamp 200 passes through aperture 196 and impinges upon a photocell 202 to produce on output leads 204 a maximum electrical signal. However, as sensor 170 pivots about pin 172 in either direction because of the linear movement of conductor 174, the area of the aperture 196 in line with the lamp 200 and photocell 202 is decreased in proportion to the angle of rotation. Consequently, the electrical output voltage on leads 204 and photocell 202 decreases in proportion to the angle of displacement of sensor 170 and thereby in accordance with the velocity of the strip conductor 174.

FIG. 13A shows a linear induction motor sliding door operator incorporating an eddy current velocity sensor embodying this invention. Door 210 is slidable and door 212 is fixed. A pair of rollers 214 and 216 are rotatably mounted on door 210 and support it on a fixed rod 218. Fixed to the top of door 210 is a flat conductor strip 220 which serves as the armature or plunger of a linear induction motor 222. The stator of motor 222 is supported by flanges 224 and 226 which are fixed to the frame 228 of the door assembly. An eddy current velocity transducer 230 is pivotally mounted to a pair of arms 232, 233 fixed to the motor stator 222.

FIG. 13B is an enlarged cross-sectional view of velocity sensor 230 and FIG. 13C is a side view of FIG. 13B. These figures show more clearly the manner in which velocity sensor 230 is mounted. The velocity sensor is of the permanent magneto-mechanical type illustrated in FIG. 8. A soft iron U-shaped core 234 is pivotally mounted by means of a pin 236 to arms 232, 233 which extend from and are fixed to stator housing 222. A pair of permanent magnets 238 and 240 are fixed to the inner surfaces of the core 234 to define an air gap through which linear conductor 220 passes.

Furthermore, a liquid potentiometer 242 of the type illustrated in FIG. 11 is supported by an element 244 fixed to the outer surface of the right hand leg of core 234. In addition, core 234 carries at the lower end of its right hand leg an additional permanent magnet 246 which cooperates with a stationary magnetic reed switch 248. Reed switch 248 is mounted on an arm 250 fixed to the motor stator housing 222.

Figure 15:
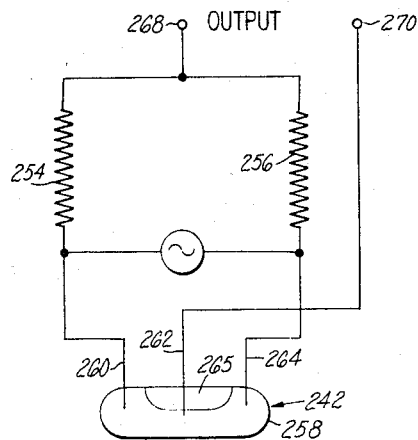
FIG. 15 is a schematic diagram of a liquid potentiometer bridge circuit.

Liquid potentiometer 242 is connected in an AC bridge circuit illustrated in FIG. 15. Two arms of the bridge are resistors 254 and 256, and the other two arms are formed by the resistance of the electrolyte 258 between the electrode pairs 260, 262 and 262, 264. When potentiometer 242 tilts, the air bubble 265 moves to unbalance the voltages appearing across these electrode pairs.

It can be seen that when the sliding door 210, and thereby conductor 220, is stationary, the potentiometer 242 is level so that a zero or a reference voltage appears across the output terminals 268 and 270 of the bridge circuit. However, when conductor 220 moves, the sensor 230 will tilt through an angle and in a direction corresponding to the velocity of the conductor. The tilt of the potentiometer 242 is not directly proportional to the speed of the conductor but rather bears a non-linear relationship thereto. The velocity dependent output voltage appearing across terminals 268, 270 may be used as the control voltage for a full wave SCR power control circuit, for example, to control the speed of the linear induction motor.

The curves 272 and 274 of the graph in FIG. 14 show in a highly idealized form the relationship of the angle of tilt of sensor 230 relative to the output voltage of potentiometer 242 across terminals 268, 270.

Figure 16:
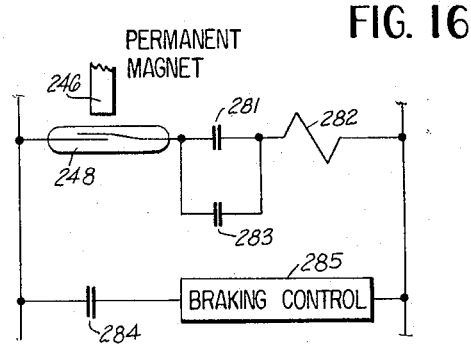
FIG. 16 shows a braking control circuit for the sliding door of FIG. 13.
Figure 17:
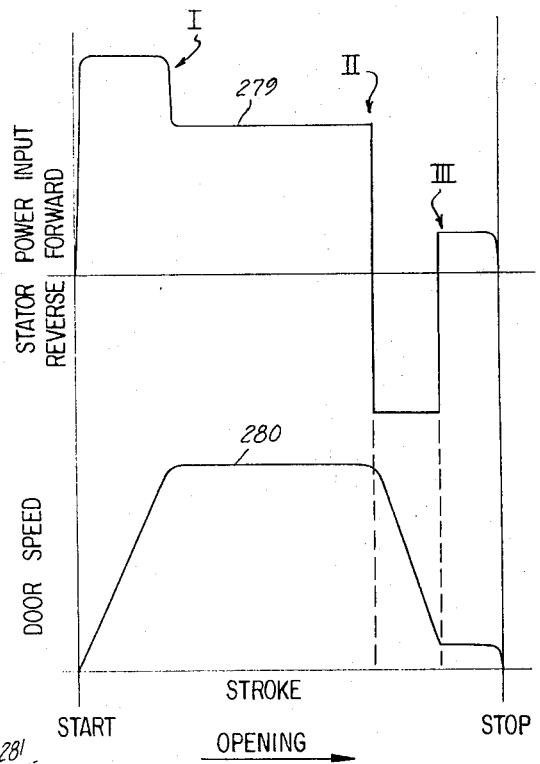
FIG. 17 is a graph showing the relationships between door position and the control power input to the linear induction motor and the speed of the sliding door of FIG. 13.

The curves 276 and 278 of FIG. 14 show the response of the single pole magnetic reed switch 248. The switch remains closed for any door speeds (or tilt angle of potentiometer 242) greater than the critical speed (or a tilt angle ±10° as illustrated in FIG. 14). This characteristic of the reed switch 248 is utilized to regulate the braking control of the door operator system as illustrated in FIG. 16. FIG. 17 shows the relationship of stator power input and door speed relative to the position of the door.

Looking at FIG. 17, let us assume that sliding door 210 is initially at rest in the closed position. When stator 222 is energized, door 210 is moved by means of the induction motor effect between stator 222 and flat conductor 220. As the door gains speed, the stator power input represented by curve 279 is proportionally reduced until the door attains the desired speed at point I on curve 280. The motor then maintains this speed until the door reaches position II at which point a position responsive switch 281 is momentarily closed to complete a circuit through the closed reed switch 248 and a relay coil 282. Energization of coil 282 closes the relay holding contacts 283 to maintain the coil energized. The main relay switch contacts 284 are also closed to actuate the braking control 285 and cause the door to lose speed. When the door speed is sufficiently lowered as at III, the magnetic reed switch 248 opens to interrupt the circuit through relay coil 282 and deactuate the braking control 285. The door is then driven in the forward direction, but with a reduced power input to the stator, until it contacts a door stop. The necessary braking action can be provided either by plugging or by injection of DC current into the stator windings of motor 222.

Figure 18:
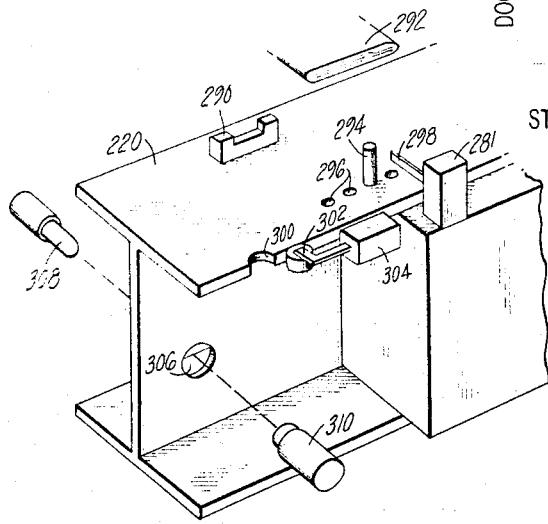
FIG. 18 shows various limit or position-responsive switches which can be incorporated in a linear induction motor sliding door operator.

FIG. 18 illustrates several means of switching programming that can be formed on the surface of the movable conductor 220. The switches are in the nature of limit or position responsive switches. For example, a permanent magnet 290 may be fixed to conductor 220 to actuate a suitably supported reed switch 292 at a predetermined position of conductor 220. In like manner, the momentary contact contact switch 281 may be mechanically actuated by means of a pin 294 which is mounted in one of a plurality of holes 296 in conductor 220 and arranged to engage an actuating arm 298 of switch 281. In addition, a notch 300 may be formed in the surface of conductor 220 to cooperate with a biased roller and arm actuator 302 for a switch 304. In another arrangement, a hole 306 may be formed in the vertical surface of conductor 220 to permit light from a lamp 308 to pass through the hole and impinge upon a photocell 310 only in a predetermined position of conductor 220 to control a switching circuit connected to the output of the photocell.

As will be apparent to persons skilled in the art, various modifications and adaptations of the structure above described will become readily apparent without departure from the spirit and scope of the invention, the scope of which is defined in the appended claims.

I claim:
1. A velocity sensor for detecting the velocity of a rod armature in a linear induction motor which armature has a tubular conductive sleeve disposed about an inner core of magnetic material relative to said sensor comprising a generally toroidal exciting winding disposed about said rod for inducing eddy currents therein and a pair of generally toroidal pick-up windings arranged on opposite sides of and adjacent to said exciting winding such that a voltage whose magnitude is proportional to speed is induced in each pick-up winding.

2. The velocity sensor as set forth in claim 1 wherein said pick-up windings are oppositely wound and series connected in parallel with an adjustable resistance to permit null balancing of the voltages induced therein.

References Cited

UNITED STATES PATENTS

| | | | |
|---|---|---|---|
| 474,447 | 5/1892 | Gibboney | 73—519 XR |
| 2,159,341 | 5/1939 | Paul. | |
| 2,367,465 | 1/1945 | Kunzer. | |
| 2,460,115 | 1/1949 | Adamson. | |
| 2,636,139 | 4/1953 | Winget | 310—12 XR |
| 2,669,310 | 2/1954 | Haskins | 73—519 XR |
| 2,706,805 | 4/1955 | Clewell | 324—70 XR |
| 3,264,560 | 8/1966 | Cheney | 73—518 XR |
| 3,328,681 | 6/1967 | Wood | 324—37 |
| 2,780,101 | 2/1957 | Kinkel | 73—517 XR |
| 3,191,436 | 6/1965 | Davis. | |

FOREIGN PATENTS

| | | |
|---|---|---|
| 1,147,787 | 4/1963 | Germany. |
| 906,712 | 9/1962 | Great Britain. |
| 1,157,500 | 12/1957 | France. |

JAMES J. GILL, *Primary Examiner.*

U.S. Cl. X.R.

73—518; 324—40